F. F. BRUCKER.
TIRE STITCHING MACHINE.
APPLICATION FILED FEB. 4, 1916.

1,218,627.

Patented Mar. 13, 1917.
4 SHEETS—SHEET 2.

Inventor:
Ferdinand F. Brucker,
Atty's.

F. F. BRUCKER.
TIRE STITCHING MACHINE.
APPLICATION FILED FEB. 4, 1916.
1,218,627.
Patented Mar. 13, 1917.
4 SHEETS—SHEET 4.
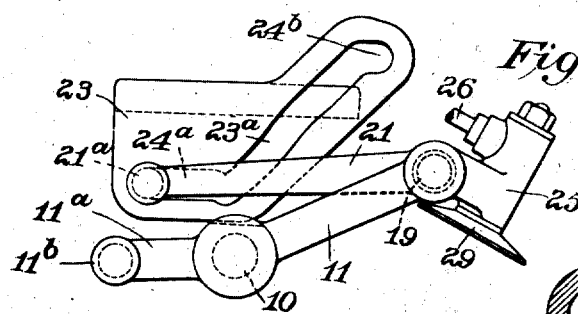
Fig. 4.
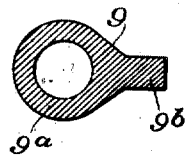
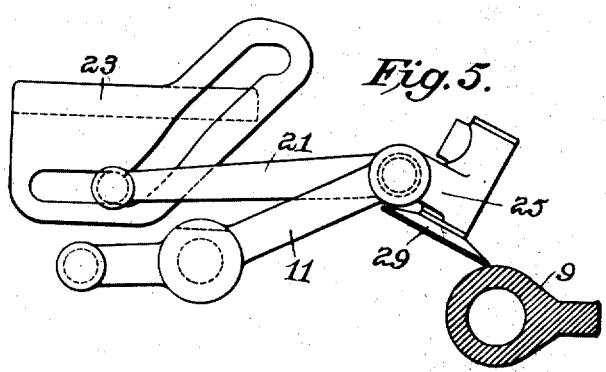
Fig. 5.
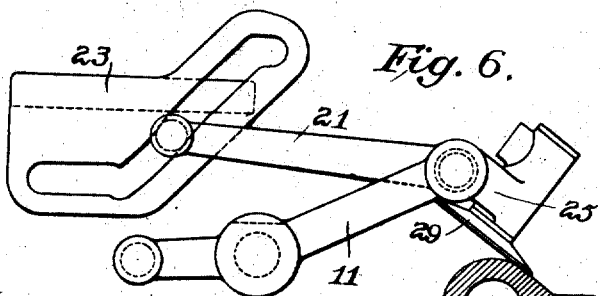
Fig. 6.
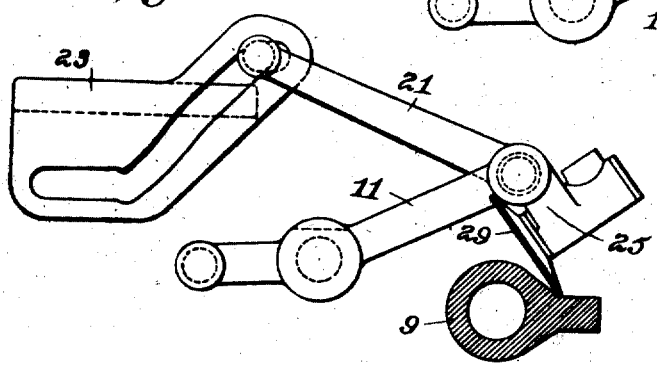
Fig. 7.
Inventor:
Ferdinand F. Brucker,
by
Attys.

UNITED STATES PATENT OFFICE.

FERDINAND FRANCIS BRUCKER, OF AKRON, OHIO, ASSIGNOR TO THE MILLER RUBBER COMPANY, OF AKRON, OHIO, A CORPORATION OF OHIO.

TIRE-STITCHING MACHINE.

1,218,627.  Specification of Letters Patent.  Patented Mar. 13, 1917.

Application filed February 4, 1916. Serial No. 76,170.

*To all whom it may concern:*

Be it known that I, FERDINAND F. BRUCKER, a citizen of the United States, residing at Akron, Ohio, have invented certain new and useful Improvements in Tire-Stitching Machines, of which the following is a specification.

My present invention relates to improvements in machines for shaping tire fabric upon a revoluble core to form the tire carcass or body. In devising the present machine I have had various objects in view, among which are the following:

First, to provide a machine which will be of extreme simplicity and thereby capable of being economically produced and which will be durable and efficient in action, and easily operated or controlled.

Second, I secure a construction in which the stitching or forming rolls will be positively guided to follow the contour of the core in shaping the fabric around the same, thus relieving the operator of the necessity of manually pressing said rolls against the core, or the alternative of relying wholly on the somewhat unsatisfactory action of springs or weights to secure such pressing action.

Third, to provide means whereby the relation of the forming rolls to the core may be adjusted to allow for the increasing thickness of the material on the core as the successive layers are applied.

Fourth, to provide stitching rolls operating over the body of the core in such a manner that they will draw the fabric radially of the core and into proper shape without liability of injury thereto.

Fifth, to provide an independent set of stitching rolls for shaping the fabric over the beads, thus avoiding the necessity of providing the somewhat complicated mechanism necessary for varying the angle of the rolls when a single set of rolls is used for shaping the body of the carcass and also operating over or around the beads, and avoiding also any danger of the workman using the apparatus with the rolls set at an improper angle.

With these and other objects in view the invention includes the novel features of construction and arrangement and combination of parts hereinafter described and particularly defined by the appended claims, an embodiment of my invention being illustrated in the accompanying drawings in which;

Figs. 4, 5, 6 and 7 are detail views, showing the different positions assumed by the spinning rolls in relation to the core as the shaping of a layer of fabric progresses.

Figure 1:
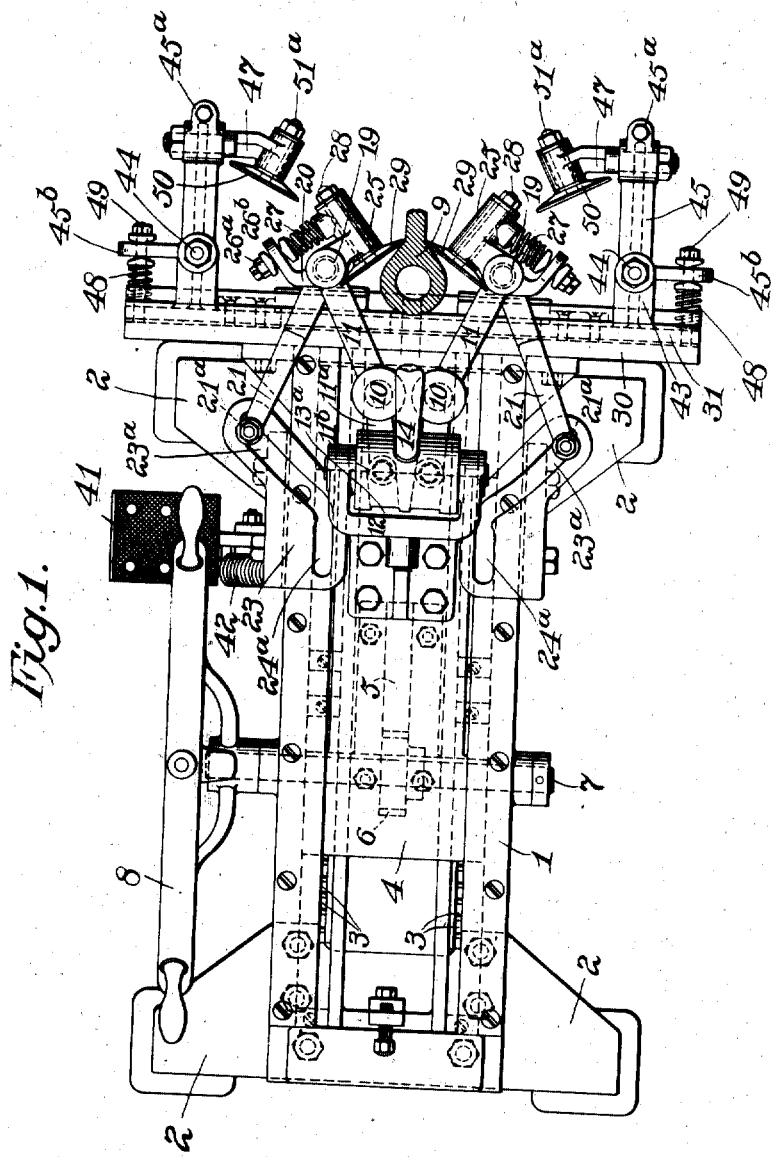
Figure 1 is a plan view of said embodiment.
Figure 2:
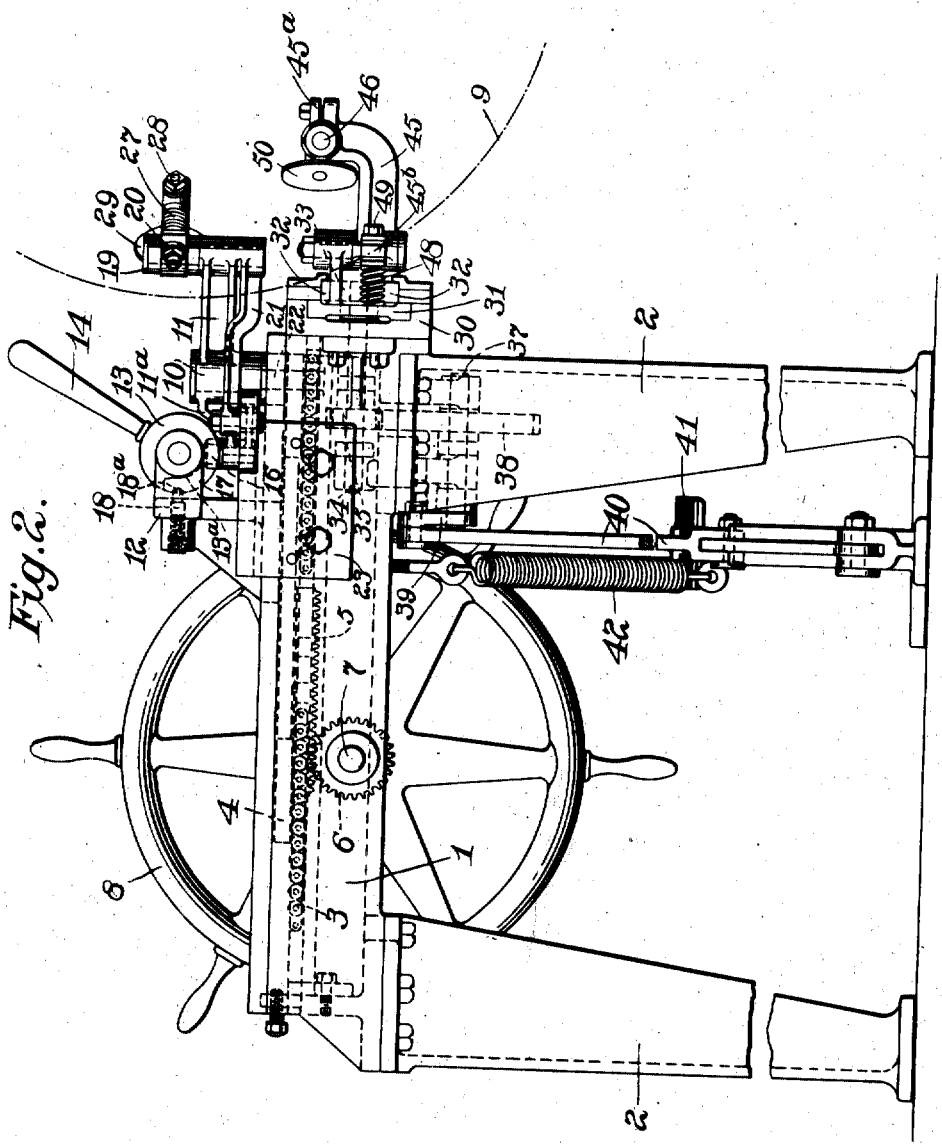
Fig. 2 is a side elevation of the same.
Figure 3:
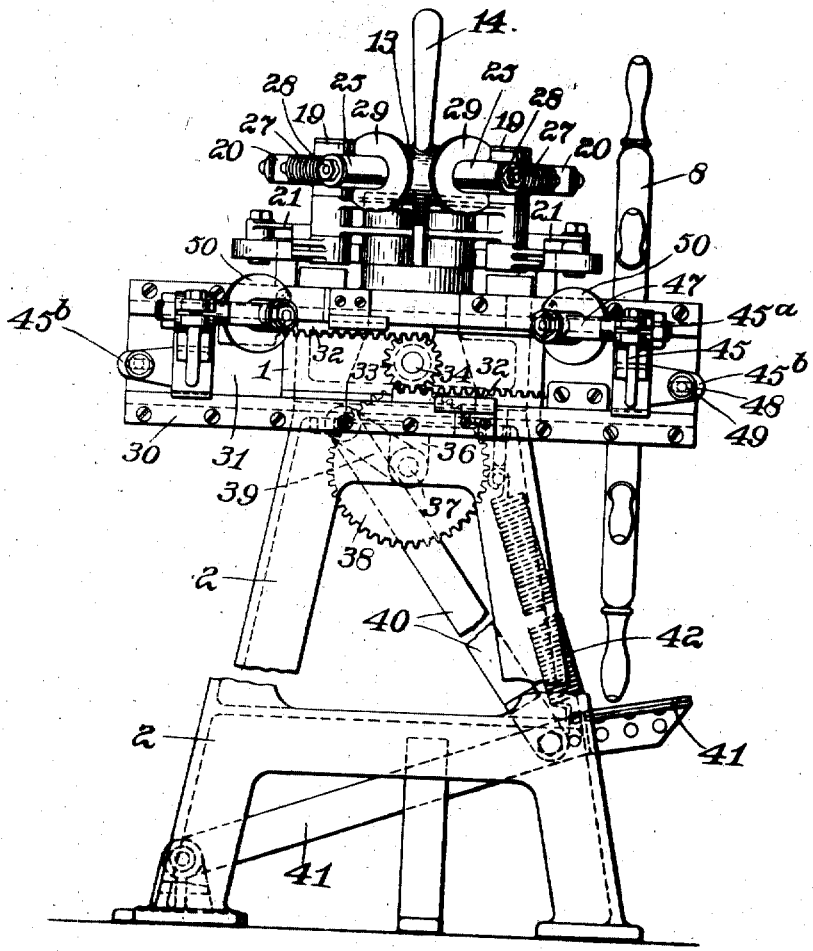
Fig. 3 is an end elevation.

Referring by reference characters to these drawings the numeral 1 designates a frame supported conveniently on legs 2 and provided with guides preferably equipped with roller bearings 3 on which a carriage 4 is slidably mounted. This carriage 4 is provided on its lower side with a rack 5 with which meshes a pinion 6 fast on a transverse shaft 7 journaled in suitable bearings in the frame. Secured to an extended end of this shaft is a hand wheel 8 by means of which the carriage may be propelled forward and backward radially of the core 9.

This core is representative of the form customarily used in rubber tire factories, and may be rotated by any means which, not forming any part of the present invention, is not shown herein.

Projecting upwardly from the forward edge of the carriage are a pair of posts 10 on which are pivotally mounted a pair of levers 11.

The carriage 4 also supports, in rear of said posts, a fork 12, within the arms, of which is journaled a drum or cylinder 13 having suitable means, such as handle 14, by which it may be rotated or oscillated.

This cylinder has cam guides adapted to coöperate with the rearwardly extended arms 11ᵃ of the levers 11, a convenient manner of effecting such coöperation being to make the cam guides in the form of grooves 13ᵃ and provide the arms 11ᵃ with rollers 11ᵇ to travel in said grooves.

The arms 11 carry at their forward ends rotatable studs or rock shafts 19 provided at their upper ends with rigidly attached or integral brackets 20.

Arms 21 have their forward ends rigidly connected to said rock shafts and their rear ends adapted to coöperate with fixed guides supported from the frame of the machine, a convenient manner of effecting such coöperation being to provide the rear ends of the arms 21 with rollers 21ᵃ traveling in cam slots or grooves 23ª in plates 23 which are detachably secured to the frame of the machine.

Brackets 25 are mounted to oscillate on the studs or rock shafts 19 and are resiliently or yieldably connected to brackets 20, which brackets 20 are rigidly secured to rock shaft 19 by suitable means, such as bolts 26 provided with nuts 26ª at their outer ends, rock washers 26ᵇ, and compression springs 27 encircling the bolts between brackets and the inner washers.

Brackets 25 form bearings for stud shafts 28, which carry at their inner ends the stitcher disks or wheels 29 each of which, for a purpose hereinafter more fully set forth, is preferably flat on one face and of a convex or approximately flat truncated cone shape on the opposite face or side which is connected to the stud shaft.

The purpose of making the stitcher wheels or disks of substantially the shape shown is to enable them to work approximately tangential to the surface of the core during a considerable portion of their movement radially of the core.

I have observed that the action of the fabric during the time it is being shaped or formed about the core is a deforming action, and not a stitching action such as frequently described.

The strips of friction fabric to be applied to the core are bias strips, the threads of which cross each other at right angles. The fabric is applied initially to the core under tension which draws it down over the outer portion of the core. When thus drawn down the fabric is deformed by the longitudinal strain and the relation of the crossing threads at the periphery of the core is distorted so, that instead of forming squares as in the unapplied fabric, they form rhomboids, with the longest diameter extending circumferentially of the core. As the sides of the core are approached the fabric has been less extended and I have observed that at the medium line of the core the threads cross each other at approximately right angles.

For the fabric to be applied smoothly from this medium line inward it is obvious that it must be circumferentially shortened to an increasing degree as the axis of the core is approached and this shortening can only take place by again altering the shape of the squares formed by the crossing threads to rhomboid form, but this time with the longest diameter of each rhomboid extending radially of the core, the elongation increasing as the inner edge of the core is approached.

This radial elongation of the squares into rhomboids is effected by tension or strain applied to the fabric in a direction toward the axis of the core and I have found that the best results are secured by having the spinning disks or wheels act as nearly tangential as practicable.

This I am enabled to do by having a spinning wheel or disk supported wholly from its outer face and having the face which is juxtaposed to the core or fabric thereon substantially flat, as shown.

Returning now to the mechanism heretofore described, it will be seen that when the carriage is fully retracted the rollers on the rear ends of the arms 21 lie in the rear parallel portions 24ª of the guide slots 23ª, at which time the spinning wheels or rolls are fully retracted and occupy the position shown in Fig. 4, permitting the core to be conveniently put in position. The operator having fed the strip of tire material to the core and its tension causing it to assume a position in which the fabric lies smoothly upon the outer periphery of the core about one-half way down over the curved sides thereof, the operator thereafter operates the hand wheel 8 to feed the carriage forward until the spinning wheels or disks contact with the fabric on the core slightly back from the point where the fabric begins to leave the surface of the core, the parallel portions of the slots, permitting this movement. Thereafter, the operator continues to turn the hand wheel to propel the carriage forward and the rollers on the rear end of the arm travel along the diverging portions of the slots, causing the spinning wheels or rolls to exert a tension on the fabric radially of the core but at the same time keeping it pressed against the core. In other words, the travel of the rollers on the rear ends of the arms 21 in the guide slots as the carriage progresses automatically causes the working edge of the rolls or disks to follow the contour of the core and while there is necessarily a slight shift in the angle of the face of the spinning rolls or disks with relation to the plane of the core, due to the swinging movement of the parts described, yet the face of the disk during greater part of this motion is tangential, or very nearly so, to the opposing face of the core, as shown in Fig. 6. As the working edge of the disk approaches the inner flange or extension of the core indicated at 9ᵇ the rollers at the outer ends of the arms encounter the elongated slots or portions 24ᵇ at the forward ends of said slots.

While as above stated, the movement of the rollers in the slots causes the working edge of the disks or rolls to follow the contour of the core, the springs 27 permit the pressure to be yieldingly applied, thereby allowing for any irregularities in the stock and also any slight wabble of the core upon its supporting spider. As the successive plies or layers of fabric are applied to the core, it will be obvious that the diameter of the body upon which the disks act will be increased. To avoid the application of excessive pressure to these exterior layers of fabric I provide the drum or cylinder 13 with its cam grooves operating upon the arms 11ª of the lever so that by rotating this cylinder by the handle 14 through successive predetermined distances the studs 19 may be moved farther apart. To hold the cylinder in its proper positions I provide a spring pin 18 engaging notches 18ª in the periphery of the cylinder.

The stitching wheels or disks 29 and operating parts are not designed for shaping the fabric over the beads. To accomplish this function, I provide a second set of disks 50, preferably of a shape similar to wheels 29 and desirably mounted at the angle shown, so as to work at an acute angle to the inner face of the beads.

These rolls are provided with stud shafts 51ª journaled in the angularly turned portions of brackets 47, which are adjustably clamped in the split bearing sockets 45ª of arms 45, of bell crank levers, which levers are pivoted at 44 in lugs or brackets 43 carried by slides 31. Arms 45ᵇ of the bell crank levers are acted upon by compression springs 48 encircling bolts 49, which are connected to the slides and pass through openings in the arms 45ᵇ, being provided with nuts and rock washers, as shown.

The slides 31 are movable in guides or ways 30 extending transversely of the machine frame and are provided with racks 32 which mesh with opposite sides of a pinion 33 mounted on a shaft 34. On this shaft 34 is a second pinion 35, which meshes with a gear or pinion 38 fast on a shaft 37 journaled in the main frame, which shaft is provided with a crank 39 connected by pitman 40 with a treadle 41.

Downward pressure on this foot lever 41 will rotate shaft 37 and through the train of gears and racks above described, cause the racks to be moved to bring the stitching wheels or disks 50 nearer together to effect the shaping of the fabric around the bead cores, the degree of pressure being governed by the pressure of the foot of the operator.

A spring 42 tends to hold the treadle normally elevated and the stitcher wheels normally separated, and to return said parts to normal position when the pressure on the treadle is removed.

The entire operation of the machine in building tires thereon may be briefly stated as follows:

I first apply several layers of fabric to the core by the use of the stitcher wheels 29 as hereinbefore described and then apply a pair of bead cores, over which the remaining plies are laid. In applying the layers of fabric which overlay the beads, the fabric, after being laid on the tire, is stitched by the stitcher wheels 29 as already described, until said stitching wheels 29 reach the bead cores. When this point is reached the operator grasps the handle 14, and gradually pulls it backward, at the same time keeping the stitching wheels against the bead cores with slight pressure, by gradually moving hand-wheel 8 forward. Due to these movements, the fabric will be laid over the outside of the bead cores by the gradual separation of the stitcher wheels 29 under the action of cam grooves 11ᵇ on arms 11ª and the edges of the fabric will be turned in, toward the axis of the core. Pressure is then applied to foot treadle 41, bringing stitching wheels 50 into action where the stitching wheels 29 left off.

By continuing pressure on foot treadle 41, the fabric will be laid down to the inner surface of the bead; after which, both sets of stitching wheels may be withdrawn.

The machine as above described is adapted to form tires of one cross sectional size only but of any diameter. This is however, no objection as tire factories manufacture many hundreds and, in fact, thousands of tires a day. Thus there is no necessity for having a machine adaptable for tires of different cross sectional dimensions, while by having a machine operating on only a single size of tire, it may be carefully adjusted or designed to secure the best effect, and not depend on the skill of the operator. Such operator, by working entirely on one size of tire is free from the necessity of manually adjusting the movement of the main stitching rolls to accord with varying sizes of tires as in a universal machine, and can make more rapid progress.

It is obvious that by the change of a few parts, such as cam plates and stitcher arms the machine may readily be changed to operate upon a tire of different cross sectional area.

Having thus described my invention what I claim is:

1. A machine of the character described comprising a revoluble core upon which a tire may be built, a pair of devices for forming material about the core, means for causing relative movement of said devices and core in a direction radially of the core, and cam controlled means for causing such forming means to follow the contour of the core during such radial movement.

2. A machine of the character described comprising a revoluble core upon which a tire may be built, a pair of devices for forming material about the core, means for causing relative movement of said devices and core in a direction radially of the core, and cam controlled means for causing such forming means to follow the contour of the core during such radial movement, and springs interposed between said cam controlled means and the forming means.

3. A machine of the character described comprising a revoluble core, devices for forming material about the core, means for moving said devices radially of the core and cam controlled means rendered effective by said radial movement for causing said devices to follow the contour of the core.

4. A machine of the character described comprising a revoluble core upon which a tire may be built, a pair of devices for forming material about the core, means for causing relative movement of said devices and core in a direction radially of the core, and cam controlled means for causing such forming means to follow the contour of the core during such radial movement, and means for changing the relation of said forming devices to said cam controlled means as successive plies of material are applied to said core.

5. A machine of the character described comprising a revoluble core, devices for forming material about the core, means for moving said devices radially of the core, and cam controlled means rendered effective by said radial movement for causing said devices to follow the contour of the core, and means for changing the relation of said forming devices to said cam controlled means as the successive layers of material are applied to the core.

6. A machine of the character described comprising a revoluble core, devices for forming material on the core, means for moving said devices radially of the core, cam controlled means rendered effective by said radial movement for causing said devices to follow the contour of the core and spring means interposed between said cam controlled means and said forming devices.

7. A machine of the character described comprising a revoluble core, devices for forming material on the core, means for moving said devices radially of the core, cam controlled means rendered effective by said radial movement for causing said devices to follow the contour of the core, and spring means interposed between said cam controlled means and said forming devices, and manually controlled means for modifying the action of said cam controlled means.

8. A machine of the character described comprising a revoluble core, a carriage movable radially of the core, a pair of arms pivotally supported from said carriage, devices carried by said arms for forming the material on the core, and stationary cam guides coacting with said arms for causing the forming devices to follow the contour of the core.

9. A machine of the character described comprising a revoluble core, a carriage movable radially of the core, a pair of arms pivotally supported from said carriage, a pair of forming devices resiliently connected to said arms, and stationary cam guides coacting with said arms.

10. A machine of the character described comprising a revoluble core, a carriage movable radially of the core, a pair of levers fulcrumed on the carriage, arms pivotally connected with said levers, forming devices operatively connected with said arms, stationary cam guides coacting with said arms, and adjusting means for positioning said levers.

11. A machine of the character described comprising a revoluble core, a carriage movable radially of the core, a pair of levers fulcrumed on the carriage, arms pivotally connected with said levers, forming devices yieldingly connected with said arms, and stationary cam guides coacting with said arms, and adjusting means for positioning said levers.

12. A machine of the character described comprising a revoluble core, a carriage movable radially of the core, a pair of levers fulcrumed on the carriage, arms pivotally connected to said levers, forming devices operatively connected with said arms, stationary cam guides coacting with said levers, and a manually actuated cam for controlling the position of said levers.

13. A machine of the character described comprising a revoluble core, forming devices, means for producing relative movement of said devices, and said core in a direction radially of the core, cam devices for causing said forming devices to follow the contour of the core during such radial movement, and means for modifying the action of said cam devices.

14. A machine of the character described comprising a revoluble core, forming devices, means for producing relative movement of said devices and said core in a direction radially of the core, cam devices for causing said forming devices to follow the contour of the core during such radial movement, and means for imparting a transverse separating movement to said forming devices at the termination of the advancing radial movement.

15. A machine of the character described comprising a revoluble core, a carriage arranged to move rectilinearly in a path radial of the core, a pair of forming devices supported from the carriage and arranged to shape material over the body of the core and a pair of devices supported independently of the carriage and arranged to reciprocate in a plane perpendicular to the plane of the core.

16. A machine of the character described comprising a core, a carriage movable radially of the core, a pair of disk-shaped forming rolls supported from the carriage and converging forwardly at acute angles to the plane of the core, and a second pair of disk-shaped rollers supported independently of the carriage and converging rearwardly, and means for moving the rolls of both pairs toward and from the plane of the core.

17. In a machine of the character described, a revoluble core, a carriage, movable radially of the core, forming devices carried thereby, slides supported independently of said carriage and movable transversely of the core, and forming devices supported from said slides.

18. In a machine of the character described, a revoluble core, a carriage movable radially of the core, forming devices carried thereby, slides supported independently of said carriage and movable transversely of the core, and rotary disk-shaped forming devices supported from said slides and lying in planes at acute angles to a plane transverse to the plane of the core.

19. A machine of the character described comprising a revoluble core, a carriage movable radially of the core, forming devices carried thereby, slides movable transversely to the path of movement of said carriage, arms yieldingly connected to said slides, and forming disks rotatably supported from said arms.

20. A machine of the character described comprising a revoluble core, a carriage movable radially of the core, forming devices carried thereby, slides movable transversely of the plane of movement of said carriage, spring pressed arms supported by said slides, brackets secured to said arms, and forming wheels of substantially disk-shape, each having one side only rotatably connected with one of said brackets leaving the other face free and unobstructed.

FERDINAND FRANCIS BRUCKER.